United States Patent [19]

Saunders

[11] Patent Number: 5,125,470
[45] Date of Patent: Jun. 30, 1992

[54] HOVERCRAFT

[75] Inventor: Albert G. Saunders, Hamilton, New Zealand

[73] Assignees: Donald Arthur Saunders; Wayne Steven Piper, both of Whangaparaos, New Zealand

[21] Appl. No.: 527,192

[22] Filed: May 23, 1990

[30] Foreign Application Priority Data

May 24, 1989 [NZ] New Zealand .................. 229259

[51] Int. Cl.⁵ .............................................. B60V 3/08
[52] U.S. Cl. ................................. 180/116; 180/117; 180/120
[58] Field of Search ............... 180/116, 117, 120–122; 114/67 A; 244/12.1, 12.5

[56] References Cited

U.S. PATENT DOCUMENTS

| | | | |
|---|---|---|---|
| 3,173,509 | 3/1965 | Wernicke et al. | 180/120 |
| 3,208,543 | 9/1965 | Crowley | 180/116 |
| 3,467,213 | 9/1969 | Walker | 180/120 |
| 3,605,937 | 9/1971 | Kirwan | 180/120 |
| 3,870,121 | 3/1975 | Schneider | 180/120 X |
| 4,747,459 | 5/1988 | Penha . | |

FOREIGN PATENT DOCUMENTS

| | | |
|---|---|---|
| 930772 | 7/1973 | Canada ................. 180/117 |
| 1216338 | 12/1970 | United Kingdom . |
| 1343600 | 1/1974 | United Kingdom . |
| 1489916 | 10/1977 | United Kingdom . |
| 2088302 | 6/1982 | United Kingdom . |
| 2091659 | 8/1982 | United Kingdom . |
| 2192372 | 1/1988 | United Kingdom ................. 180/120 |

OTHER PUBLICATIONS

*Flight*, C. S. Cockerell, "The Hovercraft", Sep. 11, 1959, pp. 195–198.
Pp. 11–14; Hovering Craft & Hydrofoil; Apr. 1974 "Crossbow" in Production.
Trans RINA: Jul. 1960; drawing of SR.N1 Hovercraft.
P. 44; Flight International Supplement; Feb. 24, 1966.
Pp. 26–27; Hovering Craft & Hydrofoil; Apr. 1972 High Performance Light Hovercraft over the Cost Hump.

*Primary Examiner*—Mitchell J. Hill
*Attorney, Agent, or Firm*—Fleit, Jacobson, Cohn, Price, Holman & Stern

[57] ABSTRACT

A hovercraft is described having a fan mounted to rotate about a vertical axis. The airflow from the fan is directed to the skirt to create lift and to horizontally aligned outlets to positively propel the craft in both forward and reverse directions and, if necessary, provide a braking force. A valve arrangement is provided to alter the relative airflow between the different horizontally aligned outlets.

12 Claims, 4 Drawing Sheets

HOVERCRAFT

BACKGROUND TO THE INVENTION

This invention relates to hovercrafts

Hovercrafts have been provided for many years in a variety of forms, but having essentially two principal configurations.

In the first configuration the drive fan is mounted to rotate about a substantially horizontal axis. This arrangement provides reasonably efficient forward propulsion but the fan projects prominently, causes significant airflow over the remainder of the craft and must be comprehensively guarded to avoid objects being unintentionally drawn into the fan.

In the second configuration the fan is mounted to rotate about a vertical axis. This results in a more compact arrangement and one which is inherently safer and more comfortable to operate. However, hovercrafts of this configuration have, in the past, suffered from relatively poor directional control. More particularly hovercraft of this configuration have only been provided with a single outlet for the airflow which propels the craft. As a result it has not been possible to reverse or brake the craft using the airflow created by the main fan.

It is an object of the invention to provide a hovercraft and/or a method of operating the same which will at least provide the public with a useful choice.

The present invention is directed to the second configuration of hovercraft discussed above and provides a form of craft which retains the traditional benefits denied from mounting the fan to rotate about a vertical axis yet which allows a greater degree of directional control.

It is an object of the invention to provide a hovercraft of the type which has a fan mounted to rotate about a substantially vertical axis, which can be positively reversed or braked by redirecting the airflow normally employed to propel the craft in the forward direction.

BRIEF SUMMARY OF THE INVENTION

Accordingly, in a first aspect, the invention consists in a hovercraft having a fan mounted to rotate about a substantially vertical axis; a first outlet down stream from said fan, said first outlet being aligned to direct air substantially horizontally in a first direction; a second outlet downstream from said fan, said second outlet being arranged to direct air substantially horizontally in a direction other than said first direction; and valve means operable to selectively direct air from said fan to said first or said second outlets.

As is typical, the hovercraft according to the invention preferably has a bow and a stern, the first outlet preferably being arranged at the stern so as to direct air substantially rearwardly from the hovercraft to propel the craft in the forward direction. The second outlet is preferably located at the bow of the draft to direct air in a substantially forward direction when it is desired to reverse.

In a second aspect the invention consists in a method of displacing a hovercraft in a rearward direction said method comprising the steps of redirecting air displaced rearwardly to propel the craft in the forward direction, through at least one forwardly facing outlet.

A hovercraft configured as hereinbefore set forth and provided with separate skirt ducting along opposite lateral edges of the craft may be provided with banking means to control the roll angle during cornering. The banking means preferably includes means to selectively control the air flow to the skirt ducting on opposite sides of the hovercraft.

When provided with this feature the hovercraft preferably further includes laterally extending ducts feeding air to the skirt ducting, the laterally extending ducts having valving to selectively control the air flow therethrough. This valving preferably comprises butterfly flaps pivotally mounted in each of the laterally extending ducts the butterfly flaps being operatively connected to the control column of the craft.

The invention consists in the foregoing and also envisages constructions of which the following gives examples only.

DESCRIPTION OF THE PREFERRED EMBODIMENT

Figure 1:
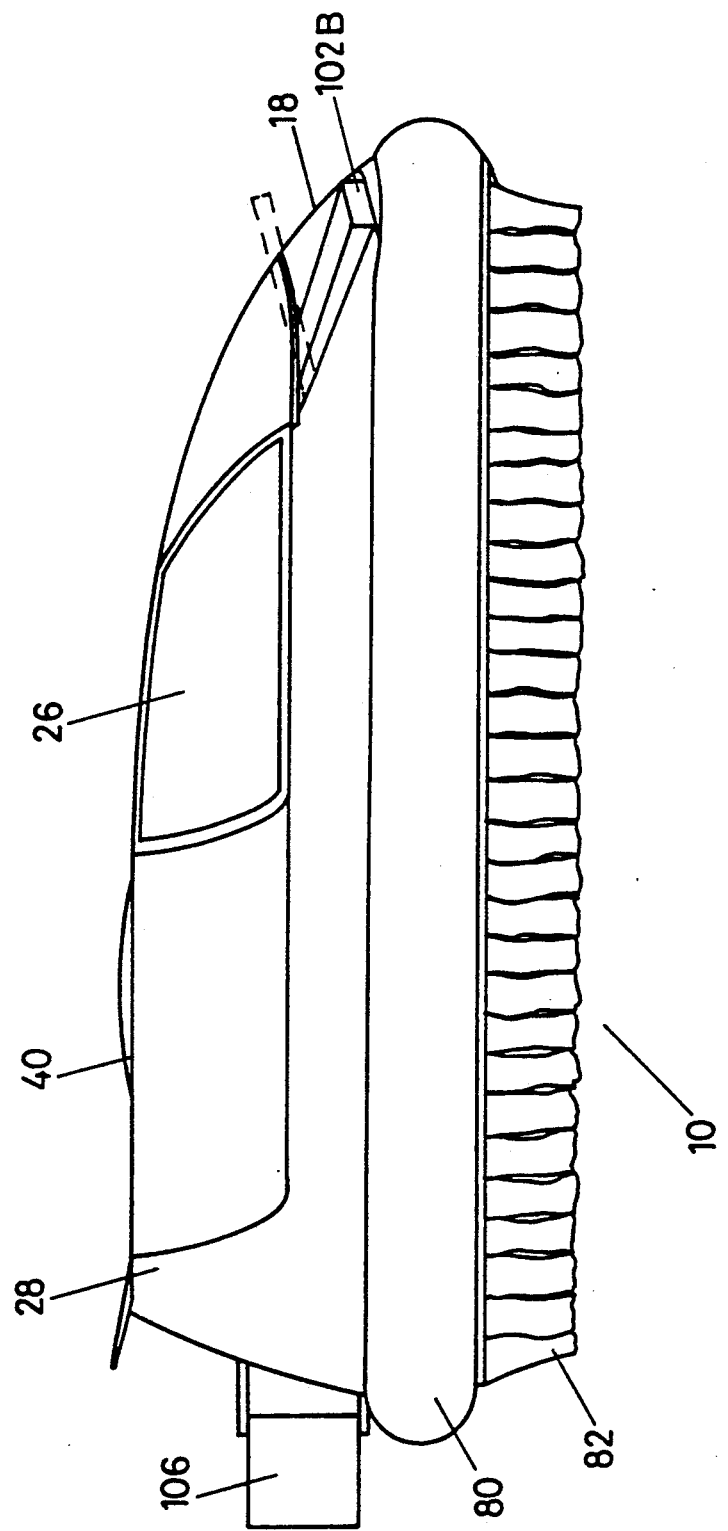
FIG. 1 shows a side elevational view of a hovercraft according to the invention.

Referring to the drawings according to the invention a hovercraft 10 is provided which has a fan 12 mounted to rotate about a substantially vertical axis 14. A first outlet 16 is provided downstream from the fan 12 as are one or more second outlets 18. It will be noted that both the first and second outlets are aligned to direct the air flow generated by the fan 12 in substantially horizontal directions, the air flow from the outlet 16 being directed in a different direction to the air flows directed by the second outlet or outlets 18. Valve means indicated generally by reference numeral 20 are provided to selectively split the air flow generated by the fan 12 between the outlet 16 and the outlet or outlets 18.

In keeping with its function, the hovercraft 10 has a bow 22 and a stern 24. As can be seen from the drawings, the outlet 16 is located at or adjacent the stern 24 and is arranged to direct air flow from the fan 12 rearwardly and symmetrically about the longitudinal centre line of the craft. In the embodiment depicted and herein described, two outlets 18 are provided which are located equi-distant from the bow 22 and are located equi-distant from the longitudinal centre line as can be seen from FIG. 3.

The forward section of the hovercraft houses a cabin 26 while the rear part of the hovercraft is defined by a rear body housing 28, the housing 28 enclosing most of the operative parts of the craft to be described in greater detail hereinafter.

Figure 2:
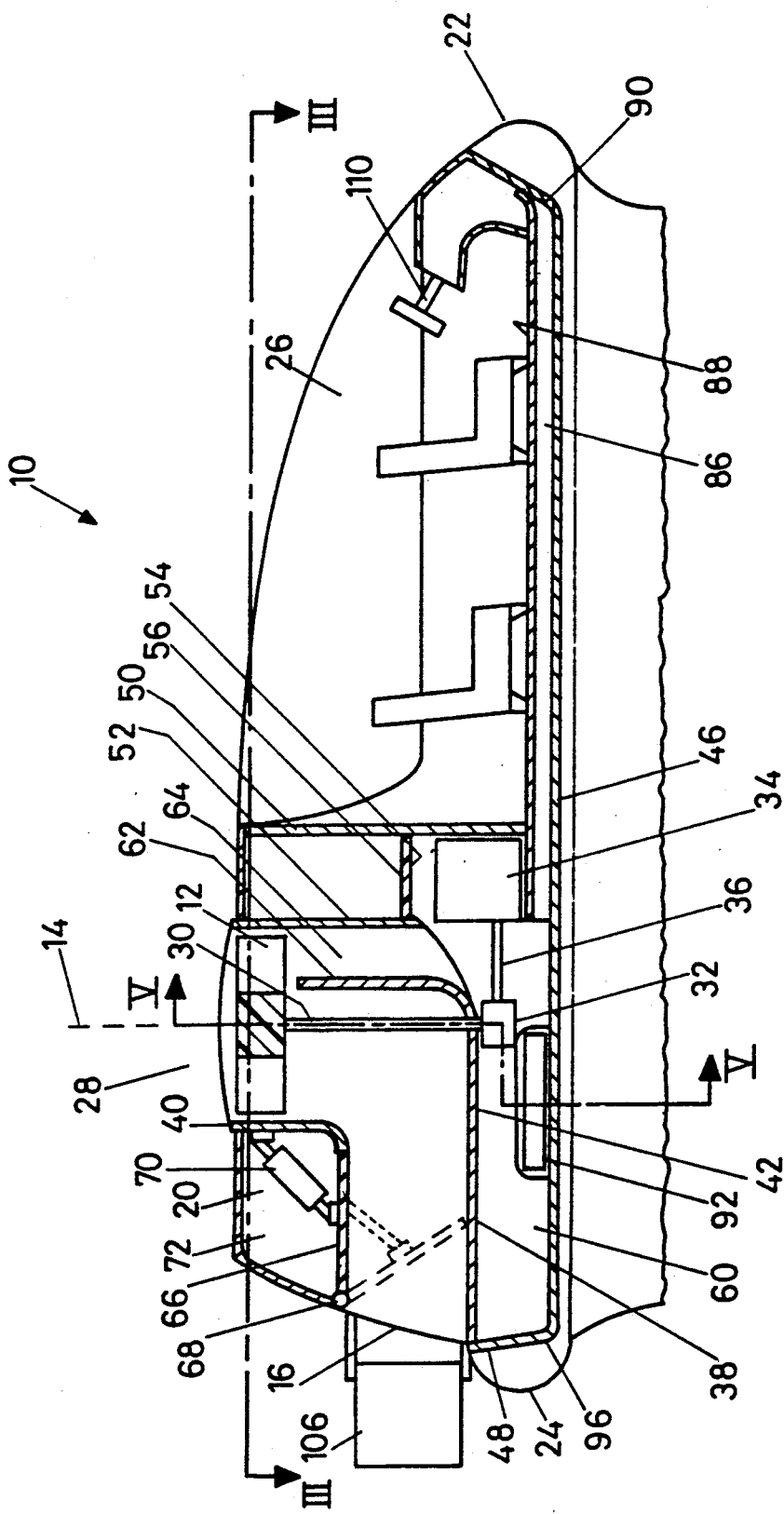
FIG. 2 shows an enlarged schematic cross-sectional view of the hovercraft shown in FIG. 1.
Figure 3:
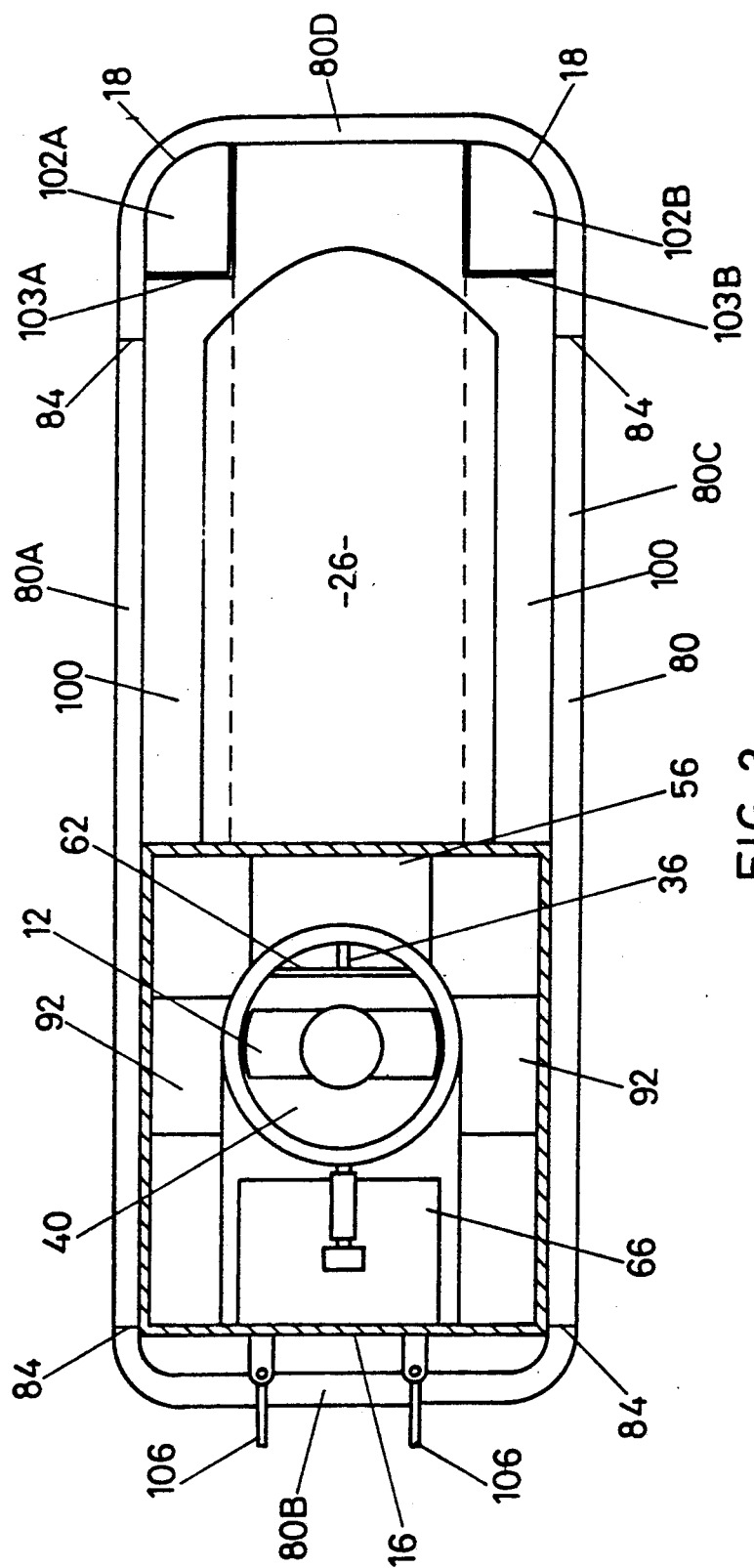
FIG. 3 shows a view along the line III in FIG. 2.
Figure 5:
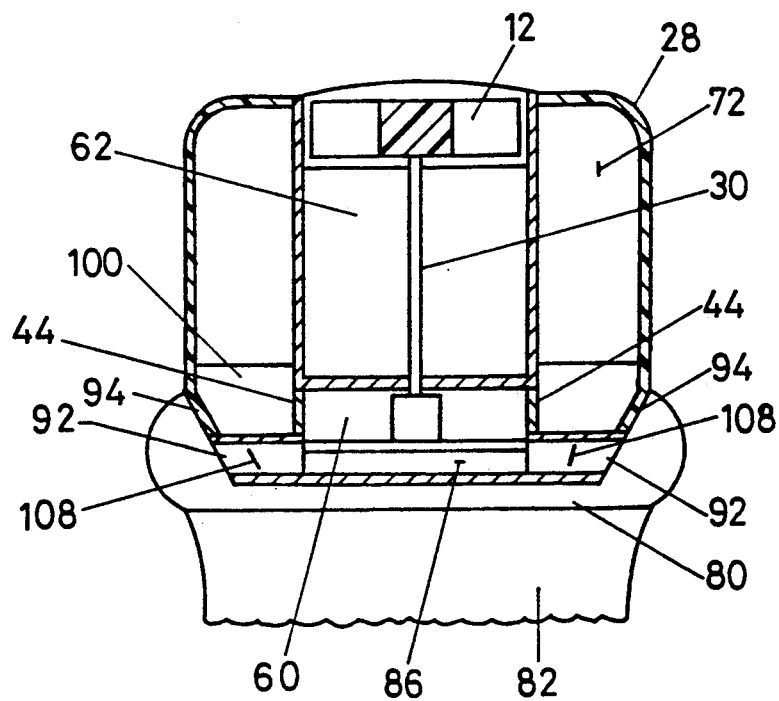
FIG. 5 shows a view along the line V—V in FIG. 2.

Referring, in particular, to FIGS. 2, 3 and 5 it will be noted that the fan 12 is mounted on the upper end of fan shaft 30, the lower end of the fan shaft 30 being connected to the output side of a right angled gearbox 32. Motor 34 drives the gearbox 32 through shaft 36. A suitable coupling (not shown) such as a centrifugal clutch or fluid coupling may be provided between the motor 34 and the gearbox 32.

The fan shaft 30 extends through the floor of a substantially elbow shaped fan duct 38. The duct 38 has a substantially circular inlet 40 and a substantially rectangular outlet which define the outlet 16. The base 42 of the duct is supported on spaced bearers 44 (FIG. 5). The bearers 44 are equispaced from the longitudinal centre line of the craft and extend upwardly from the hull base 46 and inwardly from the rear wall or transom 48. The bearers extend forward to bulk head 50 which separates the interior of the rear housing 28 from the interior of the cabin 26. The bearers 44 further extend partly around and up the forward edge 52 of the fan duct, the upper forward edges of the bearers being capped by a plate 56 which is also sealed both to the fan duct and the bulk head 50. Thus a first pressure chamber 60 is defined between the underside of the fan duct, the inner surfaces of the bearers, the rear section of the hull, the bulk head 50 and the plate 56.

The fan duct 38 further includes a vertical splitter plate 62 which, in combination with the forward section of the duct, defines a first air flow channel 64. The channel 64 supplies air compressed by the fan 12 to the first pressure chamber 60.

A substantial part of the upper horizontal surface of the duct 38 is defined by a flap 66 which is hinged along its rear edge 68. The flap 66 is pivotable between a closed position shown in solid outline in FIG. 2, and an open position shown in dotted outline in FIG. 2, by an actuator 70, the actuator being mounted between the flap and the outer surface of the vertical section of duct 38. The actuator 70 may be one or more hydraulic, pneumatic, or electric actuating rams or combinations of these.

When the flap 66 is in the open position an aperture is defined in the upper horizontal surface of the fan duct 38 which allows air flow generated by the fan 12 to exit the fan duct and enter second pressure chamber 72 which comprises the interior of the rear body housing 28 less the space occupied by the first pressure chamber 60 and the space occupied by the fan duct 28.

It will be appreciated that when the flap is in the fully lowered position as indicated by the dotted outline in FIG. 2, substantially all the air flow which would normally exit through outlet 16 is directed up through the aperture in the fan duct and into the second pressure chamber 72. When the flap 66 is in positions intermediate those indicated in FIG. 2 the air flow may be split, to a varying extent, between flowing out through the outlet 16 and into the second pressure chamber 72.

The air flow directed into the first pressure chamber 60 is used to inflate the skirt 80 which, in accordance with conventional hovercraft practice, surround the lower boundary of the craft. The air flow supplied to the skirt 80, in combination with flexible fingers 82 extending downwardly from the bottom edge of the skirt, creates the lift. The skirt 80 is divided into four sections 80A, 80B, 80C, 80D by dividers 84 (FIG. 3). To this end air flow channel, 86 defined between the hull base 46 and the cabin floor 88 provides a path for the pressurised air in the chamber 60, forward. This air exits through slot 90 in the forward edge of the hull and inflates the forward skirt section 80D. The two side sections 80A, 80C of the skirt 80 are inflated through laterally extending ducts 92 which extend through the bearers 44 and between the bearers 44 and the lower sides 94 of the hull. The rear section 80B of the skirt 80 is inflated through slot 96 provided in the rear wall 48 of the hull.

Movement of the flap 66 generates either forward or rearward movement depending on the position of the flap. When the flap is in the closed position indicated in FIG. 2 then the air flow passes out through outlet 16 and causes the hovercraft to move in the forward direction. When the flap is in the fully open position allowing the airflow to be directed into second pressure chamber 72, the air exits the second pressure chamber 72 through forwardly extending ducts 100 (FIG. 3) which terminate in the outlets 18. Covers 102A and 102B hinged at their rear edges 103A and 103B respectively are provided to cover the outlets 18. When the flap 66 is closed so, usually, are covers 102A, 102B. When, however, the flap 66 is lowered, the covers 102A and 102B are raised so as to allow the air to exit the outlets 18 and generate reverse thrust for rearward movement or braking.

When it is desired to rotate or turn the craft during reversing one of the covers 102 may be opened while the other remains closed. This will generate some degree of movement about the centre line of the craft. If a greater moment is required then pivoting flaps (not shown) may be provided in the outer side walls of the ducts 100 adjacent the forward edges thereof so that thrust may be generated at right angles to the sides of the craft.

Figure 4:
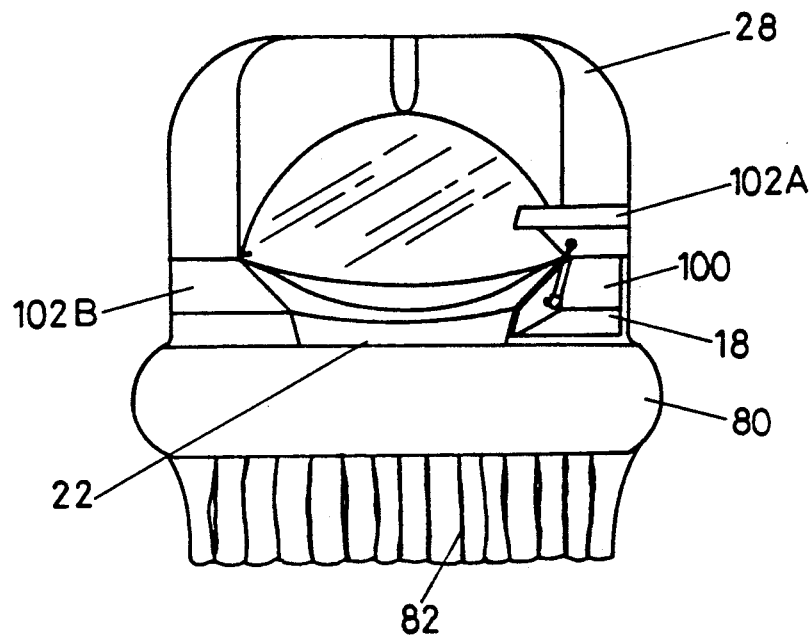
FIG. 4 shows a front view of the hovercraft shown in FIG. 2.

In FIG. 4 the cover 102A is shown in the open position while the cover 102B is shown in the closed position.

It will be appreciated that steering while the craft is moving in the forward direction is effected by use of the rudders 106 which are mounted just outside the outlet 16. If desired, or if necessary, horizontal elevators (not shown) may be provided adjacent the outlet 16 to allow for alteration of the pitch of the craft.

The craft is preferably provided with means to bank the craft while turning. This banking means preferably operates by altering the lift generated on opposite sides of the craft by, in turn, varying the amount of air supplied to the skirt sections 80A, 80C on opposite sides of the craft. This is advantageously achieved by controlling the air flow through the laterally extending ducts 92. In the embodiment shown butterfly flaps 108 are pivotally mounted in each of the ducts 92. Thus, by altering the position of the flaps 108 within the ducts 92, the air flow through the ducts can be controlled. When the craft turns to the right the butterfly valve in left hand duct is positioned so as to be fully open while the butterfly valve the right duct 92 is positioned to partially close off the duct and thus reduce the air flow supplied to the skirt section 80C. This causes the right hand side of the craft to drop with respect to the left. When the craft is turned to the left then the left hand duct 92 may be partially blocked to reduce the airflow to skirt section 80A.

The positions of the flap 66, the covers 102, the rudders 106 and the butterfly valves 108 are determined by the position of control column 110. The column 110 may be linked to the various components through any suitable means such as electronic circuitry, hydraulic cr pneumatic circuitry, cables or combinations of these.

The apertures in the hull walls which supply the skirt sections may be provided with flexible covers (not shown) which are biased to overlie the apertures when the air flow stops and the craft settles on water.

The skirt technology and fingers are all constructed in accordance with established hovercraft technology and do not form any part of this invention.

It will thus be appreciated that the present invention provides a hovercraft which, unlike hovercraft heretofore, can be positively driven in the forward and rearward directions, can be braked and can be banked during cornering. The degree of control which results provides considerable advantages.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

What is claimed is:

1. A hovercraft having a body with a bow, a stern, and a longitudinal center-line, a fan impeller mounted in said body to rotate about a vertical axis, a fan duct down-stream of said fan impeller for receiving air delivered by the fan impeller, lift air directing means in the fan duct for directing part of the air delivered by said fan impeller below the hovercraft to provide lift, conduit walls defining a conduit connected to said fan duct, a first outlet means from said conduit aligned in said body to direct air rearwardly, pressure chamber walls defining a pressure chamber, one of said pressure chamber walls also forming one of said conduit walls to form a common wall, an opening in said common wall between said pressure chamber and said conduit, a second outlet means communicating with said pressure chamber aligned to direct air at least forwardly, and a manually operable valve means in said common wall operable to move between a position closing said opening and a further position closing said conduit down-stream of said opening to thus control air flow through said first and second outlet means to selectively control motion of the hovercraft in forward and reverse directions.

2. A hovercraft as claimed in claim 1 wherein said second outlet means comprises two outlets provided adjacent the bow, said two outlets being symmetrically spaced from the longitudinal center-line.

3. A hovercraft as claimed in claim 2 wherein said two outlets are provided with openable covers.

4. A hovercraft as claimed in claim 1 wherein said conduit is elbow-shaped and said first outlet means is defined by an aperture in a rear surface of said body.

5. A hovercraft as claimed in claim 2 including ducts extending from said pressure chamber and terminating in said two outlets.

6. A hovercraft as claimed in claim 1 wherein said valve means comprises a hinged flap in said common wall, said flap being operable selectively to place the interior of said conduit in communication with said pressure chamber.

7. A hovercraft as claimed in claim 6 wherein said flap is positioned to vary the cross-sectional area of said conduit through which air passes to said first outlet means to control airflow through said first outlet means, said area being variable between conditions with said conduit being fully open and fully closed respectively.

8. A hovercraft as claim in claim 7 wherein said lift air directing means comprises a splitter plate in said fan duct which, in combination with a wall of the fan duct, defines an air channel to direct lift air downwardly.

9. A hovercraft as claimed in claim 8 having a hovercraft skirt with a front, a rear and two opposite sides and wherein a plurality of skirt supply ducts extend from said air channel to supply air to the hovercraft skirt.

10. A hovercraft as claimed in claim 9 wherein said plurality of skirt supply ducts include a pair of laterally extending ducts to direct airflow to opposite side sections of the skirt.

11. A hovercraft as claimed in claim 10 wherein said laterally extending ducts include manually controllable valve means to vary air flow therethrough.

12. A hovercraft as claimed in claim 11 wherein said manually controllable valve means comprise butterfly valves.

* * * * *